United States Patent [19]

Sweetland et al.

[11] Patent Number: 4,885,953
[45] Date of Patent: Dec. 12, 1989

[54] GEAR TRAIN HOUSING OF AN ENGINE

[75] Inventors: Roger D. Sweetland; Francis M. Hager, both of Columbus, Ind.

[73] Assignee: Cummins Engine Company, Inc., Columbus, Ind.

[21] Appl. No.: 626,936

[22] Filed: Jul. 2, 1984

[51] Int. Cl.⁴ .................. F16H 57/02; F01M 13/02
[52] U.S. Cl. ........................ 74/606 R; 123/196 CP
[58] Field of Search ............... 74/606 R; 123/195 C, 123/196 CP

[56] References Cited

U.S. PATENT DOCUMENTS

| | | | |
|---|---|---|---|
| 2,211,154 | 8/1940 | Oshei | 74/606 R |
| 4,124,011 | 11/1978 | Saito et al. | |
| 4,242,923 | 1/1981 | Nishikawa et al. | 74/606 R |
| 4,270,497 | 6/1981 | Valerio | |
| 4,353,332 | 10/1982 | Sweetland | 123/196 CP |
| 4,433,593 | 2/1984 | Ikemoto et al. | 74/606 R |

Primary Examiner—Rodney M. Lindsey
Attorney, Agent, or Firm—Sixbey, Friedman, Leedom & Ferguson

[57] ABSTRACT

A gear train housing of an engine of the type having an internal gear space located within housing parts which include at least one housing body part and at least one cover part. In accordance with a preferred embodiment, the lower end of the gear space is substantially of a V-shape defined laterally on opposite sides by a radially facing sloping walls of the housing body part. In order to minimize oil related problems, bosses on the upwardly facing sloping walls have a wedge-like shape with a downwardly inclined, inwardly facing surface and are free of upwardly sloping surface portions which can collect fluid flowing over the bosses in proximity to a gasket seal between edge faces of the housing parts, and a splash shield is formed for preventing excessive quantities of oil from being splashed, by a crankshaft gear, into the area of other gears of the gear train, so as to reduce associated frictional losses.

7 Claims, 3 Drawing Sheets

GEAR TRAIN HOUSING OF AN ENGINE

DESCRIPTION

1. Technical Field

The present invention relates to the field of gear housing design, and in particular to the covering or shrouding of the gear train of an engine wherein a crankshaft is utilized to drive a plurality of engine accessory gears.

2. Background Art

While a generous supply of lubricating oil is a prerequisite to the life of an engine, such as an internal combustion engine, in order to prevent wear damage or seizing up of rotating parts of the engine, including its accessory gear train, too much oil in the wrong locations within a gear train housing can be problematic as well.

For example, typically a gear train housing of an engine has an internal gear space that is located within housing parts that are joined together at vertically oriented edge faces, with a gasket seal therebetween, by bolts passing through one of the housing parts and through bosses formed on the edge face of another of the housing parts. Even though some contact between the oil in the housing and the gasket seal is inherent in this design, it is undesirable to have pools of oil accumulate in contact with the gasket seal during the long periods of time when the engine is not operating.

The source of one such oil related problem is depicted in the prior art illustration of FIG. 1. With reference to this figure, a portion of a wall of a gear train housing 1 is shown having a vertically oriented edge face 3, against which a gasket seal would be located. A second housing part, having an opposed, vertically oriented edge face, would be sealed against the end face 3, with the gasket seal therebetween, through the use of bolts that would pass through apertured bosses 5. The bosses 5 are typical of those used in the prior art in that they have a circularly rounded surface which projects into the gear space defined by housing 1.

However, when such bosses are situated on upwardly facing sloping wall surfaces of the type shown in FIG. 1, the upper fillet 7 of these bosses is recessed below the highest point of the curved surface of the bosses 5. As a result, these fillets 7 represent oil collecting spaces having a depth d. Thus, when the engine is shut off and the gear train stopped, oil will flow down these sloping walls of the gear train housing and the fillet 7 will fill with oil which will stand in contact with the gasket seals throughout at least the entire period during which the engine is at rest. Such oil exposure can lead to the gasket becoming permanently wetted with oil, thereby causing premature deterioration of the seal which could result in oil leakage from the gear train housing.

Another oil related problem of engine gear trains is that liquid displacement losses due to the viscosity of oil will occur if too much oil becomes entrained in the gears that are driven by the crankshaft gear. This can occur due to the gear pump effect produced by the crankshaft gear. This problem especially affects gear trains in closely conforming housings that result in one or more gears being located in a relatively small off-chute arm of the housing.

The use of a splash guard in an oil pan of an internal combustion engine is known, U.S. Pat. No. 4,270,497) for preventing oil splash produced by a rotating crankshaft assembly hitting the surfaces of oil within the oil pan. Similarly, U.S. Pat. No. 4,124,011 shows the use of a splash guard partition wall for preventing lubricating oil splashed in a timing chain chamber, by rotation of the timing chain, from getting into the valve chamber of an overhead camshaft engine and passing out through an oil filler port thereof. However, no attempts have been made to deal with the oil splash effect within gear train housings, or to utilize splash wall partitions in a gear train housing in any manner, particularly so as to prevent oil from being splashed by a crankshaft gear into areas which can produce significant frictional losses.

DISCLOSURE OF THE INVENTION

In light of the foregoing, it is a general object of the present invention to provide a gear train housing of an engine which will significantly reduce problems which are attributable to too much oil being accumulated in undesired locations.

In connection with the foregoing object, it is an object of the present invention to provide a gear train housing which will not be subject to premature gasket seal failure as a result of pooled oil having permanently wetted the gasket seal.

It is a particular object of the present invention to provide a gear train housing that utilizes bosses that have a wedge-like shape with a downwardly inclined, inwardly facing surface and which are free of upwardly sloped surface portions that can collect fluid flowing over the bosses in proximity to the gasket seal between the edge faces of housing parts at internal upwardly facing and sloping, internal wall surfaces.

It is yet another object of the present invention to provide a gear train housing that has a splash shield which is positioned, relative to an in-use position and rotational direction of a crankshaft gear so as to prevent oil from being splashed by the crankshaft gear up into other areas of the gear train where they will produce undesirable viscous liquid displacement losses.

A particular object of the present invention is to provide a gear train housing with a splash shield that is formed by an approximately horizontal overhang wall that projects from an upwardly facing sloping wall of a lower end portion of the gear space of the gear train housing.

These and other objects are achieved, in accordance with a preferred embodiment of the present invention, by a gear train housing of an engine which has an internal gear space located within housing parts that include at least one housing body part and at least one housing cover part which are joined together, at opposed vertically oriented edge faces with a gasket seal therebetween, by bolts passing through the housing parts and bosses of the housing body part. The gear space is defined by internal wall surfaces of the housing parts which include an upwardly facing sloping wall surface of the housing body part along which some of the bosses are located.

In order to prevent pooling of oil on the bosses of this upwardly facing sloping wall surface, the bosses are provided, relative to a direction of gravitational fluid flow along the sloping wall surface, with a wedge-like shape that has a downwardly inclined, inwardly facing surface and which are free of sloping surface portions that can collect fluid flowing over the bosses in proximity to the gasket seal between the edge faces of the housing parts.

In accordance with preferred forms of the wedge-like bosses, these bosses may have a single-wedge shape with a circularly rounded downstream end, at which a bolt hole for a respective bolt is located, or they may have a double-wedge shape with a rounded apex at which the bolt hole is located. Advantageously, the downwardly inclined, inwardly facing surface of the wedge-like shape of these bosses is inclined five degrees from a horizontal orientation.

In accordance with another feature, a preferred embodiment of the invention, the lower end portion of the gear space is substantially of a V-shape that is defined, laterally, by upwardly facing walls of the housing body part. This lower end portion is constructed and arranged for receiving a crankshaft gear when, in use, the gear train housing is assembled on an engine, and one of the upwardly facing walls of the housing body part defining the V-shape, has a splash shield formed thereon. The splash shield is positioned, relative to an in-use position and rotational directional of the crankshaft gear, in association with the teeth of the crankshaft gear which are located in a lower quadrant wherein the teeth rise during rotation.

In its preferred form, the splash shield comprises an approximately horizontal overhang w all which projects from a facing sloping wall of the housing part into the vicinity at which the crankshaft gear is received. The splash shield overhang wall is supported by a vertical support wall that is connected between the upwardly facing sloping wall and the overhang wall in a plane that is situated between a plane in which a front face of the crankshaft gear is located, in use, and a front edge face of the upwardly facing sloping wall. The overhang wall is also situated below an arm of the gear space that is situated and sized for relatively closely receiving, in use, an oil pump gear.

The construction of the splash shield and its location serves to reduce viscous liquid pumping losses associated with too much oil being splashed upwardly by the crankshaft gear, particularly into the arm of the gear space containing the oil pump gear. Additionally, the splash shield tends to reduce the oil pumping effect of the crankshaft gear relative to the gear space located above the splash shield, while the location of the splash shield support wall, between the crankshaft gear front face and the location of the gasket at the edge face of the housing part, counters any problems that might occur, otherwise, from oil being applied, under pressure, against this area of the gasket seal, due to the combined effects of the gear pump action of the crankshaft gear and the flow restricting effect of the splash shield.

These and other features and objects of the present invention will become more apparent from the following detailed description and with reference to the accompanying drawings.

BEST MODE FOR CARRYING OUT THE INVENTION

Figure 1:
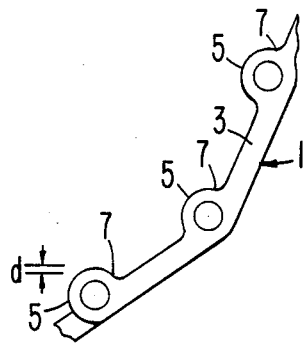
FIG. 1 is a partial elevational view of an edge face of a housing part of a gear train housing in accordance with prior art techniques.
Figure 2:
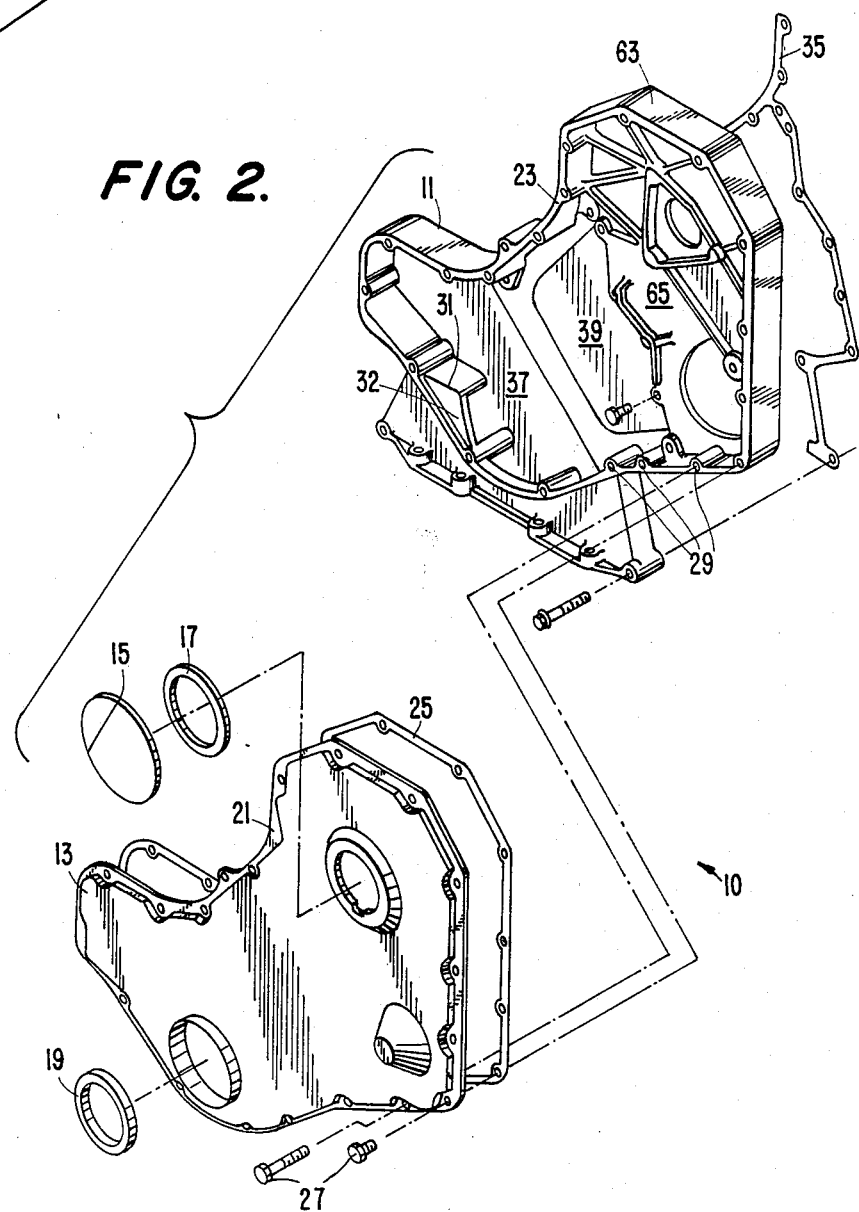
FIG. 2 is an exploded view of a gear train housing of an engine in accordance with a preferred embodiment of the present invention.

With reference to FIG. 2, a gear train housing in accordance with a preferred embodiment of the present invention is designated generally by the reference numeral 10. The gear train housing 10 is comprised of housing parts which include a housing body part 11 and a housing cover part 13. A cap 15 with a cap seal 17, as well as a crank seal 19, are associated with the housing part 13. The housing cover part 13 is joined to the housing body part 11 at vertically oriented edge faces 21,23, respectively, with a gasket seal 25 disposed therebetween. Bolts 27 (only two of which are shown in the drawings) pass through the housing parts 11, 13, and in so doing, pass through bosses 29 formed at the edge face 23 of housing body part 11.

The details of the bosses 29 will now be described in further detail with reference to FIG. 3. As can be seen, with the exception of the bosses 29 of the upwardly facing sloping walls 31, 33, the bosses 29, adjacent the edge face 23 of the housing body part 11, are of conventional design. On the other hand, the bosses 29 which are located on these upwardly facing sloping walls 31, 33 are constructed in accordance with a feature of the present invention so as to have a wedge-like shape that is free of any upwardly sloping surface portions which can collect fluid flowing over the bosses in proximity to the gasket seal between the edge faces of the housing parts.

In particular, these bosses 29 on the upwardly facing sloping wall surfaces 31,33 are of a single-wedge shape having a downwardly inclined, inwardly facing surface 29a and a circularly rounded downstream end (relative to the direction of gravitational fluid flow thereover) at which a bolt hole 29c is located. Preferably, the slope of the downwardly inclined, inwardly facing surface 29a of the wedge-like shape is inclined at an angle s of five degrees relative to a horizontal orientation. Such a five degree inclination will provide a sufficient downward slope to insure that oil running down the inner wall of surfaces 31, 33 will not collect on the bosses, yet minimizes the extent to which the width of the boss will be increased, relative to that which would occur with greater angles.

It is also noted that, while a single-wedge shape is preferred, a double-wedge shape, wherein a second sloping wall portion 29d (shown in broken lines on the next to lowermost boss 29 on the wall 31) is also provided, the bolt hole 29c then being located in a rounded apex of the double-wedge shape. Likewise, since oil cannot collect on the downstream side of the bosses 29, any convenient shape or slope can be applied thereto, as a further alternative to the rounded or sloping shapes mentioned, so long as the shaping does not create areas where oil potentially will pool in proximity to a gasket seal.

Figure 3:
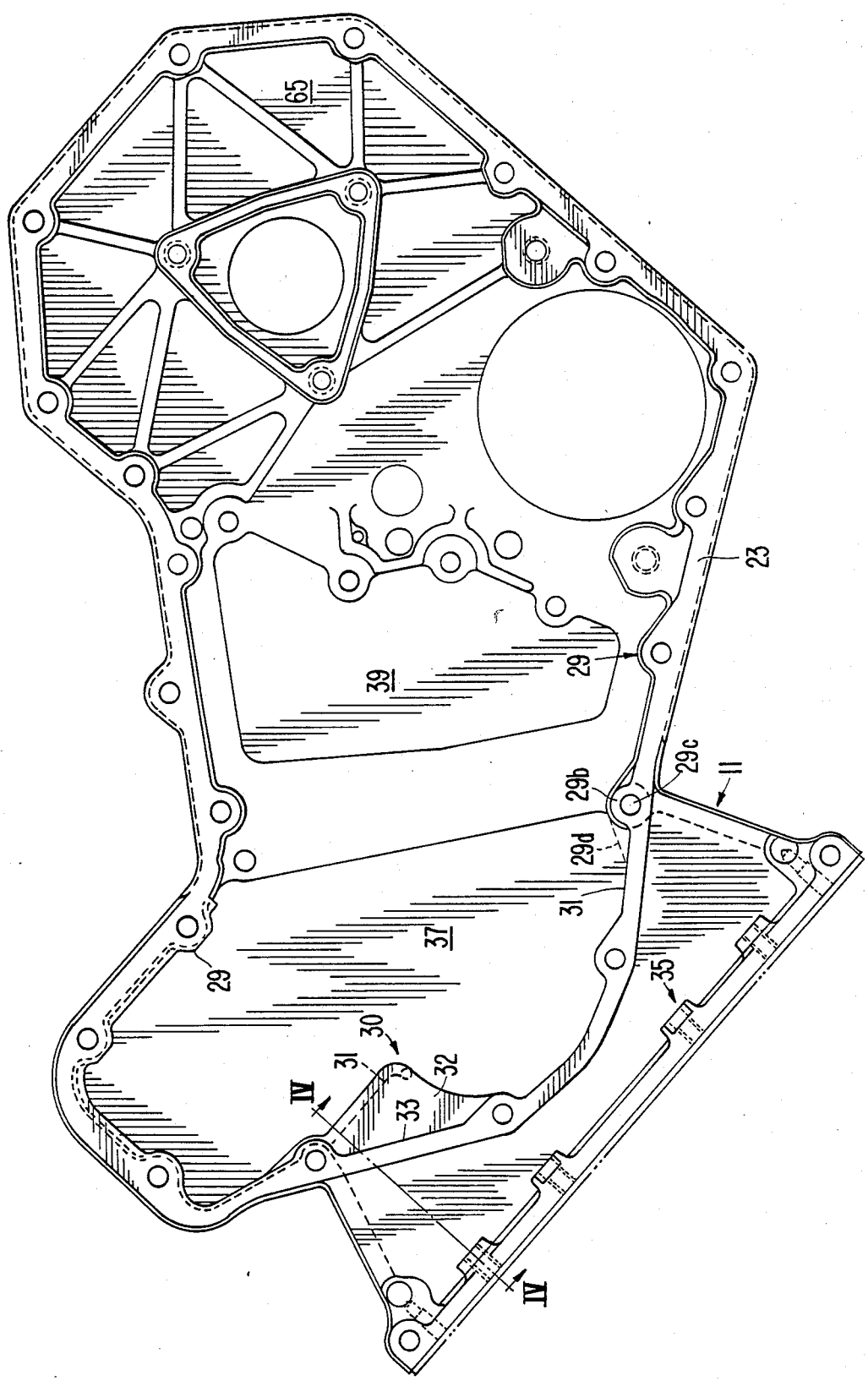
FIG. 3 is a front elevational view of a housing body part of a gear train housing in accordance with the preferred embodiment of FIG. 2.
Figure 4:
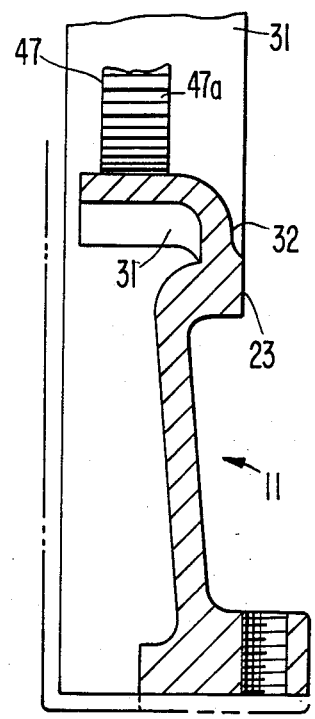
FIG. 4 is, a cross-sectional view taken along line IV—IV of FIG. 3, on an enlarged scale.

Also shown in FIG. 3, in association with upwardly facing sloping wall 33, is a shield means 30 having a splash shield 34 and a support wall 32. The splash shield 34 projects from the sloping wall 33 so as to form a horizontal overhang wall which terminates in a downwardly curved lip. The support wall 34 extends between the sloping wall 33 and the overhang wall 31 in proximity of the edge face 23. The nature and function of this shield means is best understood with reference to the following description of in-use condition of the gear train housing.

Figure 5:
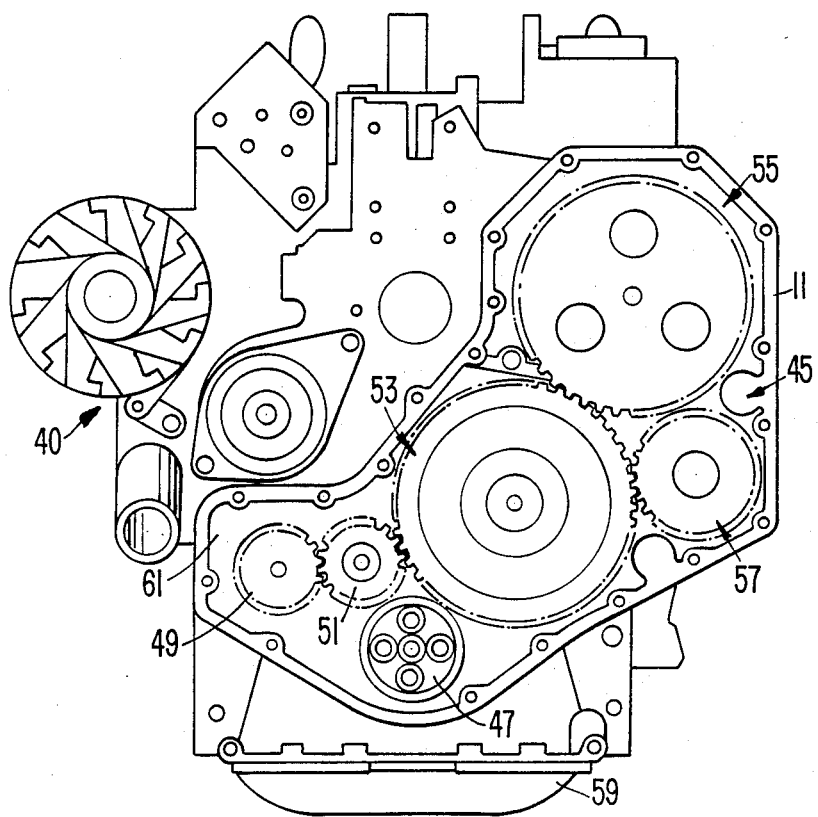
FIG. 5 is a view of the housing body part of FIG. 3 in its in-use position on an engine and with a gear train assembled therein.

In FIG. 5, the housing body part 11 is shown in its in-use position wherein it is mounted to the front face of an engine, the engine gasket seal 35 being disposed between the engine and the facing edge faces of the housing body 11. In this regard, it is noted that the engine, itself, forms a cover part with respect to the openings 37, 39 in the rear wall of the housing body part 11. Disposed within the gear housing is a gear train 45 that is composed, in the illustrated embodiment, of a crankcase gear 47, an oil pump gear 49, an oil pump idler 51, a camshaft gear 53, a fuel pump gear 55, and a power take-off gear 57 for an accessory drive.

Inasmuch as the crankcase gear 47 is disposed at the bottom of a V-shaped lower end portion of the internal gear space of the gear train housing that is defined, laterally, by the sloping walls 31, 33, the crankshaft gear will have an inherent tendency to act as a gear pump that would throw excessive quantities of oil up into the area of the other gears of the gear train 45. Such a behavior would produce significant frictional losses, especially with respect to the oil pump gear that is situated in an arm 61 of the gear space within the housing which closely receives the oil pump gear 49 (assuming a clockwise rotation of the crankshaft gear).

Because of this fact, the shield means 30 is disposed in a position relative to the in-use position and rotational direction of the crankshaft gear 47 so as to be in shielding association with the teeth of a lower quandrant Q of the crankshaft gear wherein the teeth of the gear are rising during rotation thereof, in a manner that would create an outward throwing of oil therefrom. That is, the overhang wall 34 projects into close proximity to the periphery of the crankshaft gear at a height slightly above a horizontal center line through the crankshaft gear (which is the dividing line between the upper and lower quandrants of the gear). Thus, oil thrown by the teeth of the crankshaft gear 47 will hit the shield means 30 instead of passing in large quantities up into the area of the other gears of the gear train 45, and particularly, into the area of the oil pump gear 49.

While the primary function of the splash shield 31 is to prevent viscous liquid displacement losses due to oil being splashed up into the gears of the gear train, since the splash shield will prevent excessively large quantities of oil being delivered up into the remainder of the gear space, it also produces an inherent secondary effect of reducing the potential for oil leaks developing through the gasket seals. In this connection, while the primary function of the vertical support wall 32 is to support the overhang wall 34, it too has a secondary function. That is, since the splash wall 34 will restrict upward flow of oil under the pumping action of the crankshaft gear 47, and since the shield means 30 forms a channel through which oil communicates with the oil pan 59, by situating the support wall 32 in a plane which is located between a plane that is defined by the front face 47a of the crankshaft gear 47 and the front edge face 23 of the sloping wall 33 of housing body part 11, the support wall 32 can serve to isolate, to a certain degree, the gasket seal in this portion of the edge face 23. Thus, the location of the support wall 32 can further serve, in conjunction with the wedge-like shape bosses, to reduce the likelihood of a gasket seal becoming permanently wetted.

While a preferred embodiment has been shown and described, it should be appreciated that the concepts of the present invention embodied therein, are not limited to this specific embodiment. For example, other drive train arrangements can be used instead of the specific drive train arrangement 45 that has been illustrated. Similarly, while the gear train housing of the preferred embodiment has been shown as consisting primarily of a housing body part having a perimetric wall 63 and an end wall 65, that is closed on opposite sides by the engine 40, and housing cover part 13, other housing constructions are also utilizeable in conjunction with the present invention. For example, the housing body part could be disposed with its open end facing toward the engine with a cover plate disposed between the engine and the housing body part such as in the arrangement shown in U.S. Pat. No. 4,257,370, or the housing body part may be an annular member in the nature of a spacer as in the arrangements of U.S. Pat. No. 4,261,310.

Likewise, even though all of the bosses 29 on the upwardly facing walls of the gear train housing of the preferred embodiment have the described wedge-like shape, such is not required. For example, where the housing configuration would preclude such an enlarged boss, a conventionally shaped one may be used. Also, the same holds true for bosses in locations that are not likely to pool oil, such as at the junction of splash wall 34 and sloping wall 33. Other and further modifications will also be apparent to those of ordinary in the art so that the present invention should be considered to encompass anything within the scope of the appended claims.

Industrial Applicability

The present invention is applicable to gear train housing for various configurations of gear trains of oil lubricated engines, such as internal combustion engines. The present invention will find particular utility with respect to gear train housings for gear trains that have a lowermost gear in close proximity to an oil pan of the engine and have other gears located thereabove in an arm-like arrangement that is desired to be closely confined by the gear train housing, so as not to block access to other elements mounted externally on the engine.

We claim:

1. A gear train housing of an engine of the type having an internal gear space located within housing parts, which includes at least one housing body part and at least one housing cover part, said housing parts being joined together at opposed vertical oriented edge faces, with a gasket seal therebetween, by bolts passing through said housing parts and bosses of said housing body part formed at the edge face thereof so as to be situated projecting into said gear space, wherein said gear space is defined by internal wall surfaces of said housing parts which include upwardly facing sloping wall surfaces along which some of said bosses are located; wherein a substantially V-shaped lower end portion of the gear space is defined by said upwardly facing sloping wall surfaces and wherein all of the bosses on said upwardly facing sloping wall surfaces have, in a direction of gravitational fluid flow along the upwardly facing sloping wall surfaces, a wedge-like shape having a bolt hole for a bolt at a thickest portion of the wedge-like shape and tapering from said thickest portion in a direction counter to said gravitational fluid flow so as to present an upwardly facing surface that is upwardly inclined from said thickest portion at an approximately 5 degree angle from horizontal in a manner leaving said lower end portion free of any upwardly sloping surface portions which can collect fluid flowing over the bosses in proximity to the gasket seal between the edge faces of the housing parts.

2. A gear train housing according to claim 1, wherein the wedge-like shape of the bosses on the upwardly facing sloping wall surface is a single-wedge shape with a circularly rounded downstream, in said direction of gravitational fluid flow, end at which said bolt hole for a respective bolt is located.

3. A gear train housing according to claim 2, wherein the wedge-like shape of the bosses on the upwardly facing sloping wall surface is a double-wedge shape having a rounded apex at which a respective said bolt hole for a respective bolt is located.

4. A gear train housing according to claim 1, wherein said lower end portion is constructed and arranged for receiving a crankshaft gear when, in use, the gear train housing is assembled on an engine.

5. A gear train housing according to claim 4, wherein said second upwardly facing wall of said housing body part is provided with a splash shield formed thereon, said splash shield being positioned, relative to an inuse position and rotational direction of said crankshaft gear, in shielding association with teeth of a lower quadrant of said crankshaft gear wherein said teeth rise during rotation thereof.

6. A gear train housing according to claim 5, wherein the splash shield comprises an approximately horizontal overhang wall which projects from said second upwardly facing sloping wall to the vicinity in which the crankshaft gear is received, and a vertical support wall is connected between said second upwardly facing sloping wall and said overhang wall in a plane that is situated between a plane in which a front face of the crankshaft gear is located, in use, and a front said edge face of the second upwardly facing sloping wall.

7. A gear train housing according to claim 6, wherein said overhang wall is situated below an arm of the gear space that is located and sized for relatively closely receiving, in use, and oil pump gear.

* * * * *